US008254944B2

(12) United States Patent
Kwon et al.

(10) Patent No.: US 8,254,944 B2
(45) Date of Patent: Aug. 28, 2012

(54) METHOD AND APPARATUS FOR TRANSMITTING IN MULTIPLE ANTENNAS AND CONTROLLING FEEDBACK INFORMATION

(75) Inventors: Young Hoon Kwon, San Diego, CA (US); Anthony C. K. Soong, Plano, TX (US); Cornelius Van Rensburg, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 368 days.

(21) Appl. No.: 12/353,182

(22) Filed: Jan. 13, 2009

(65) Prior Publication Data

US 2009/0179797 A1 Jul. 16, 2009

Related U.S. Application Data

(60) Provisional application No. 61/020,985, filed on Jan. 14, 2008.

(51) Int. Cl.
*H04W 72/00* (2009.01)

(52) U.S. Cl. ..................... 455/450; 455/452.2; 455/453; 343/853

(58) Field of Classification Search ........................ None
See application file for complete search history.

(56) References Cited

U.S. PATENT DOCUMENTS 6,400,335 B1 * 6/2002 Weaver et al. ................ 343/853
7,109,919 B2 * 9/2006 Howell ......................... 342/372
7,149,548 B2 * 12/2006 Mori et al. ................. 455/562.1
7,324,782 B1 * 1/2008 Rudrapatna ..................... 455/25
7,515,874 B2 * 4/2009 Nikolajevic et al. ......... 455/41.2
2001/0034236 A1 * 10/2001 Tong et al. .................... 455/450
2001/0051532 A1 * 12/2001 Voyer ............................ 455/562
2003/0162551 A1 * 8/2003 Atarashi et al. ............... 455/456
2004/0204108 A1 * 10/2004 Etkin et al. ................. 455/562.1
2005/0265300 A1 * 12/2005 van Rensburg ............... 370/342
2006/0209764 A1 * 9/2006 Kim et al. ..................... 370/334
2006/0286974 A1 * 12/2006 Gore et al. ................. 455/422.1
2007/0127586 A1 * 6/2007 Hafeez .......................... 375/267
2007/0206686 A1 * 9/2007 Vook et al. ................... 375/260
2007/0218950 A1 * 9/2007 Codreanu et al. .......... 455/562.1

OTHER PUBLICATIONS

"Selective Opportunistic Beamforming for DL MIMO," IEEE 802. 16 Broadband Wireless Access Working Group, May 7, 2008, pp. 1-17.
Kim, M., et al., "Opportunistic Beamforming Based on Multiple Weighting Vectors," IEEE Transactions on Wireless Communications, Nov. 2005, pp. 2683-2687, vol. 4, No. 6.
Sahrif, M., et al., "On the Capacity of MIMO Broadcast Channels with Partial Side Information," IEEE Ransactions on Information Theory, Feb. 2005, pp. 506-522, vol. 5, No. 2.

* cited by examiner

*Primary Examiner* — Rafael Pérez-Gutiérrez
*Assistant Examiner* — Suhail Khan
(74) *Attorney, Agent, or Firm* — Slater & Matsil, L.L.P.

(57) ABSTRACT

A method for coordinating beam forming between two communicating entities includes obtaining cell loading information and adjusting a number of used beam-sets at a specific scheduling time according to the cell loading information. The method further includes transmitting a common pilot that is not beam-formed together with feed-forward information according to the cell loading. A wireless communication system employing conventional CL-MIMO protocols can be adapted to employ the methodology.

16 Claims, 20 Drawing Sheets

| Items | Used Parameters |
| --- | --- |
| Antenna config. | 4Tx / 1Rx |
| Spatial Multiplexing | 1 (SM=1), 2 (SM=2) |
| MIMO scheme | . Codebook based (LTE 4bit codebook)<br>. Opportunistic BF<br>. SOBF |
| Scheduler | Proportional Fair |
| Channel | i.i.d Complex Gaussian |
| Mobility | Static (Perfect frame-by-frame correlation ($\rho$=1))<br>Very fast (No frame-by-frame correlation ($\rho$=0)) |
| SNR | 10dB average (Same for all users) |
| Sum rate | Shannon capacity |

Figure 13

METHOD AND APPARATUS FOR TRANSMITTING IN MULTIPLE ANTENNAS AND CONTROLLING FEEDBACK INFORMATION

This application claims the benefit of U.S. Provisional Application No. 61/020,985, filed on Jan. 14, 2008, entitled "Method and Apparatus for Transmitting in Multiple Antennas and Controlling Feedback Information," which application is hereby incorporated herein by reference.

TECHNICAL FIELD

The present invention relates generally to wireless communication systems and more specifically to methods and apparatus of beam forming in wireless communication systems.

BACKGROUND

Generally, beamforming in a wireless communication system focuses on forming directional transmission or reception signal power in the direction of an intended respective receiver or transmitter. Transmission and reception of wireless signals can benefit from beamforming in that beamforming lessens the power needed to perform the transmission of wireless signals and lessens the power causing interference directed to non-intended receivers. From a receiver's perspective, beamforming enhances the desired received signal and lessens the interference due to other transmitters or signal sources. The stronger a formed beam capacity, the higher the signal quality in the intended wireless receiver or transmitter.

Various beamforming schemes have been selected to reach a desired beamforming capacity. For example, dirty paper coding was contemplated to achieve a maximum capacity for the broadcasting channel. This approach, however, is complex and requires full channel status information which is prohibitive to be implemented in current state of the art systems. For practical solution, closed-loop (multiple-input multiple-output) MIMO techniques with precoding matrix index feedback have been proposed and selected in current wireless communications standards. However, for such techniques the amount of feedback required is proportional to the number of streams; in case of multiple users within a cell, this amount is considerable. Opportunistic beamforming schemes have also been proposed to reduce the feedback amount. While the asymptotic performance of opportunistic beamforming approaches close to that with full channel state information (CSI) feedback as the number of users increases, the performance under relatively small number of users degrades significantly.

What is needed, then, is an improved method of beamforming and systems employing same that overcome the shortcomings of the prior art.

SUMMARY OF THE INVENTION

These and other problems are generally solved or circumvented, and technical advantages are generally achieved, by preferred embodiments of the present invention.

In accordance with a preferred embodiment of the present invention, a method for coordinating beam forming between two communicating entities includes obtaining cell loading information and adjusting a number of used beam-sets at a specific scheduling time according to the cell loading information. The method further includes transmitting a common pilot that is not beam-formed together with feed-forward information according to the cell loading information.

BRIEF DESCRIPTION OF THE DRAWINGS

For a more complete understanding of the present invention, and the advantages thereof, reference is now made to the following descriptions taken in conjunction with the accompanying drawings, in which:

FIG. 1, which includes

FIG. 6, which includes

FIG. 13 illustrates parameters for simulation of preferred embodiments of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Opportunistic beamforming (BF) can be regarded as a special case of a preceding matrix feedback scheme that uses only one preceding matrix set for a specific time, which preceding matrix set varies randomly in different time slots. Because there is only one preceding matrix set at a time, it is not necessary for each user to feedback the index of the preceding matrix. Rather, each user need only feed back channel a quality indicator (CQI) for the given preceding matrix set (however in the case of multiple streams, each user should feed back a stream index along with CQI). When there are numerous users within a cell, the performance of opportunistic BF with multiple streams approaches that of coherent BF. However, it has been determined that performance degrades as the number of users decreases. This implies that a single candidate is insufficient for low user density. In embodiments of the present invention, we adaptively change the number of candidate sets for opportunistic BF according to cell loading conditions. In low user density conditions, we obtain BF gain with higher CSI resolution. In high user density conditions, we obtain multi user diversity gain with opportunistic BF.

In embodiments of the present invention, we propose a codebook allocation scheme wherein a transmitter can control the feedback overhead adaptively according to cell loading, such as a number of users in a cell. In this approach, the entire set of code words is predefined. At a given scheduling time, only part of the set of code words is used for candidate precoding vectors, and the number candidate precoding vectors is controlled by the transmitter according to cell loading. In this way, the amount of feedback signals containing preferred precoding vectors is reduced, while maintaining the cell capacity compared to current closed loop multiple input multiple output (CL-MIMO) systems employing precoding matrix index feedback.

When there are numerous users in a cell, opportunistic beamforming with multiple streams works well. This implies that the feedback information for the preferred precoding matrix does not increase system performance in this case. This also means one precoding matrix set is sufficient when numerous users are in a cell. When there are few users in a cell, opportunistic beamforming does not perform as well. This implies that one precoding matrix set is insufficient in a case of a small number of users in a cell.

Figure 1B:
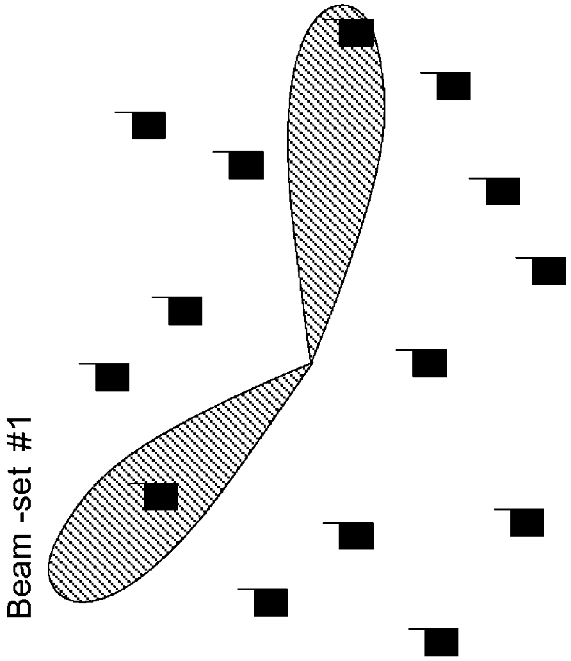
FIG. 1*a* and FIG. 1*b*, illustrates the concept of selective opportunistic beamforming.
Figure 1A:
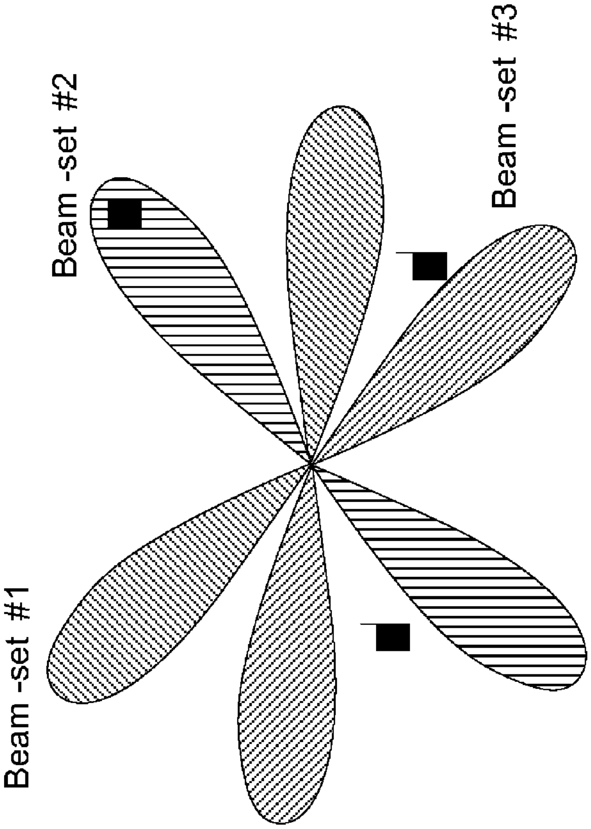

FIG. 1 illustrates selective opportunistic beamforming in a preferred embodiment, illustrating the use of multiple sets of opportunistic beam patterns at the same time. The number of beam sets can be varied according to cell conditions such as the number of users within a cell. FIG. 1(*a*) illustrates multiple beam sets for low user density, while FIG. 1(*b*) illustrates that only one beam-set may be necessary in a case of high user density. In this manner, we can reduce the amount of required feedback without losing performance if there are sufficient number of users and we can achieve high beamforming gain in the case of a small number of users. The implementation of selective opportunistic beamforming is further described below.

One aspect of selective opportunistic beamforming involves identification of multiple beam-sets. There are alternative approaches for identifying multiple beam-sets. One approach is to transmit multiple training sequences serially for Mobile Stations (MSs) to measure Carrier-to-Interference and Noise Ratio (CINR) for each beam-set. In this approach, although multiple training sequences are required, a Base Station (BS) can use true random beamforming vectors.

Another approach to identify multiple beam-sets is through the use of pre-determined beam-sets. In this approach, patterns of beam-sets are a priori known to both a BS and MSs, and the BS transmits common pilot signals without multiplying beamforming vectors. An MS multiplies beamforming vectors of predetermined beam-sets. For this approach, a BS needs to broadcast feed-forward information about what kind of beam-sets pattern is used in a given time slot. In this case, although using only one common pilot sequence, the beamforming vectors are not random but come out of predetermined sequences. This approach is currently used in CL-MIMO without dedicated pilot channels.

In both above-described approaches, each MS preferably feeds back the following: preferred beam-set index, preferred beam index within the beam-set, CINR of the preferred beam. This feedback is done after measuring a CINR of each candidate. In some embodiments, an MS feeds back information for only one beam to reduce the amount of feedback necessary. In other embodiments, an MS feeds back information for multiple beams to further increase performance.

It is noted that, in preferred embodiments, the number of beam-sets used at a specific scheduling time can be varied and adjusted adaptively according to cell loading information such as the number of users within a cell, mobile speed, and the like. Further, a BS preferably transmits a common pilot, which is not beam-formed together with feed-forward information such as a number of candidate beam-sets and a number of streams. Moreover, the amount of required feedback information is preferably controlled by a BS according to the number of candidate beam-sets.

The feed-forward information used in preferred embodiments can be a very useful feature. Two types of beam-set index allocation rules are used in providing feed-forward information in preferred embodiments.

Figure 2:
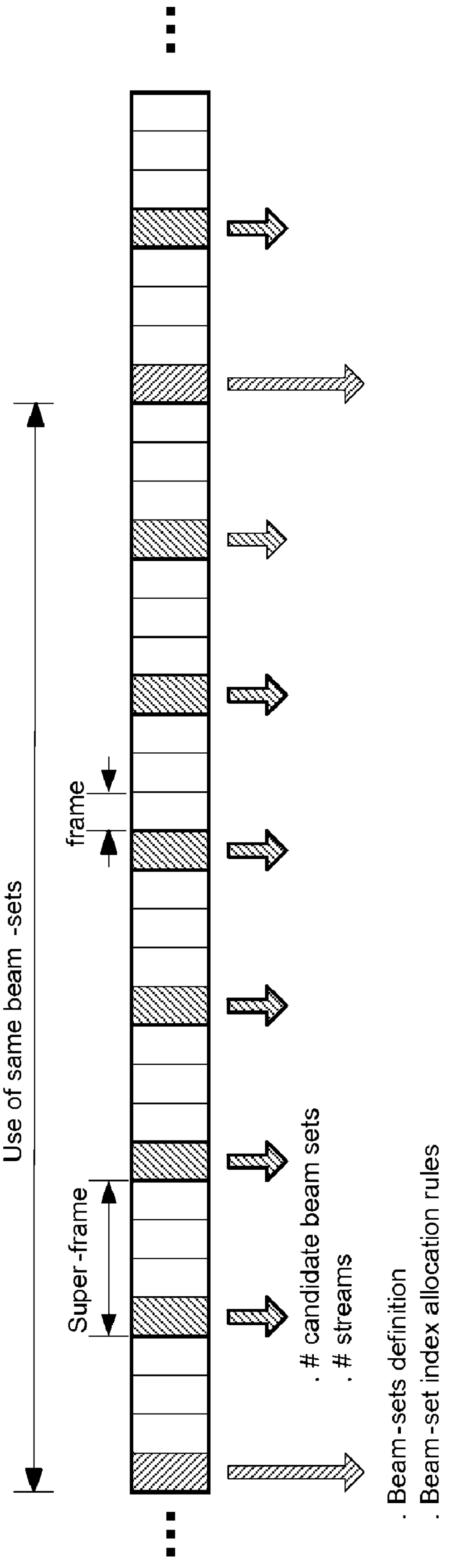
FIG. 2 schematically illustrates a scheme for feeding forward an implicit beam-set index allocation rule in an exemplary embodiment.
Figure 3:
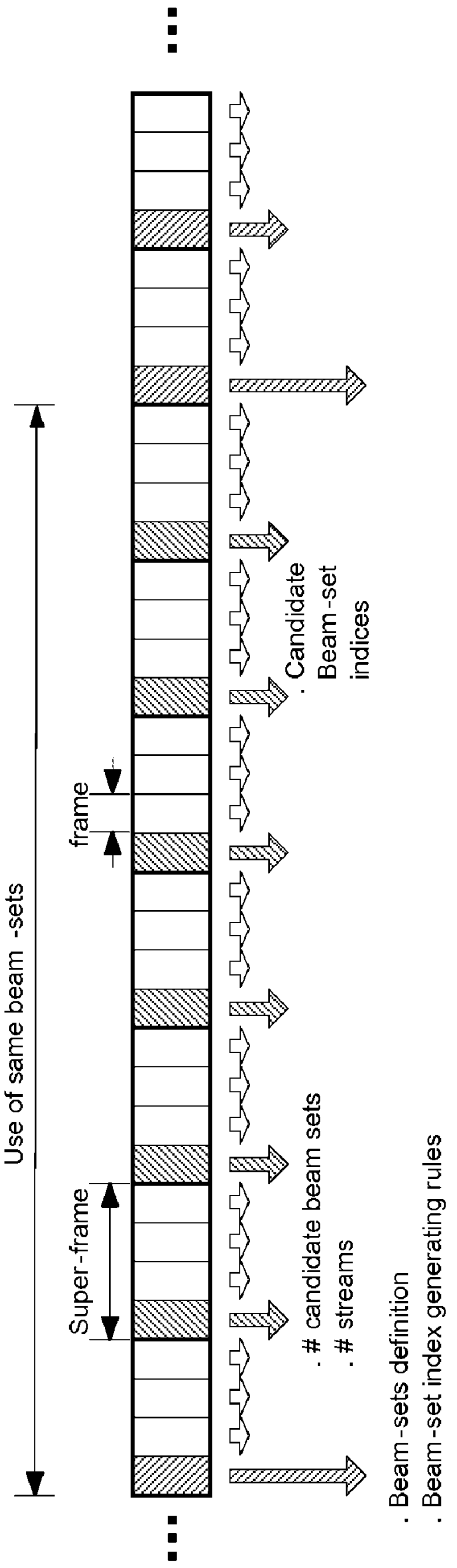
FIG. 3 schematically illustrates a scheme for feeding forward an explicit beam-set index allocation rule in an exemplary embodiment.

FIG. 2 illustrates an example where an implicit index allocation rule is used. In a preferred embodiment, the index rule is pre-defined. By contrast, FIG. 3 illustrates an example where an explicit index allocation rule is used. As shown, the explicit index rule is directly broadcast every frame. Preferably included in the feed-forward information are the number of candidate beam-sets and number of streams. When an explicit index allocation rule is used, the feed-forward information may further include candidate beam-set indices.

Figure 4:
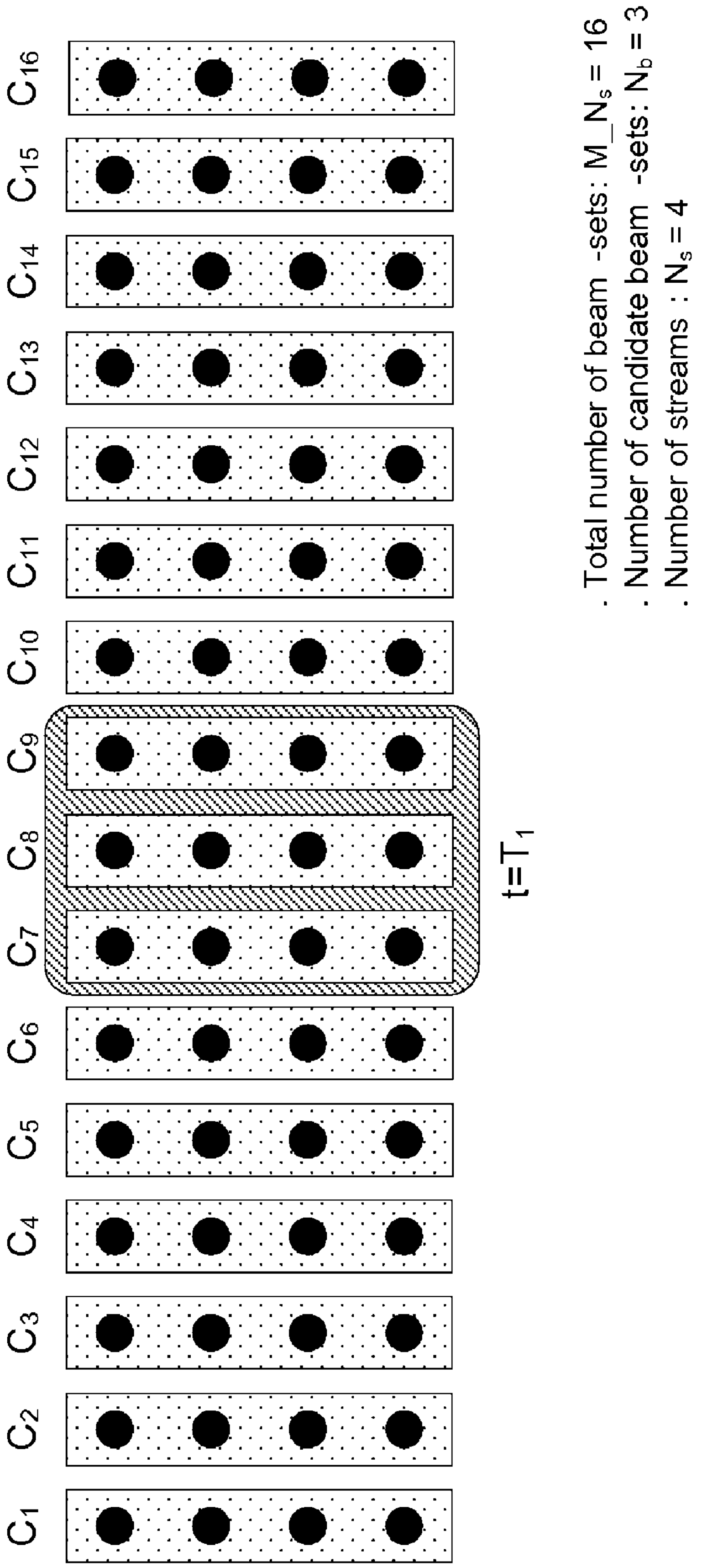
FIG. 4 illustrates an illustrative embodiment of selecting candidate beam-sets from a set of beam-sets for a given number of streams.

FIG. 4 illustrates an example where the total number of beam-sets M_Ns is equal to 16, the number of candidate beam-sets Nb is equal to 3, and the number of streams in each beam-set Ns is equal to 4. A beam set index of an implicit index allocation example yields:

$$\text{Beam set index}[i]=\text{mod}(N_b \times FRN+i, M_{N_b})\, i=0, \ldots, N_b-1$$

Figure 5:
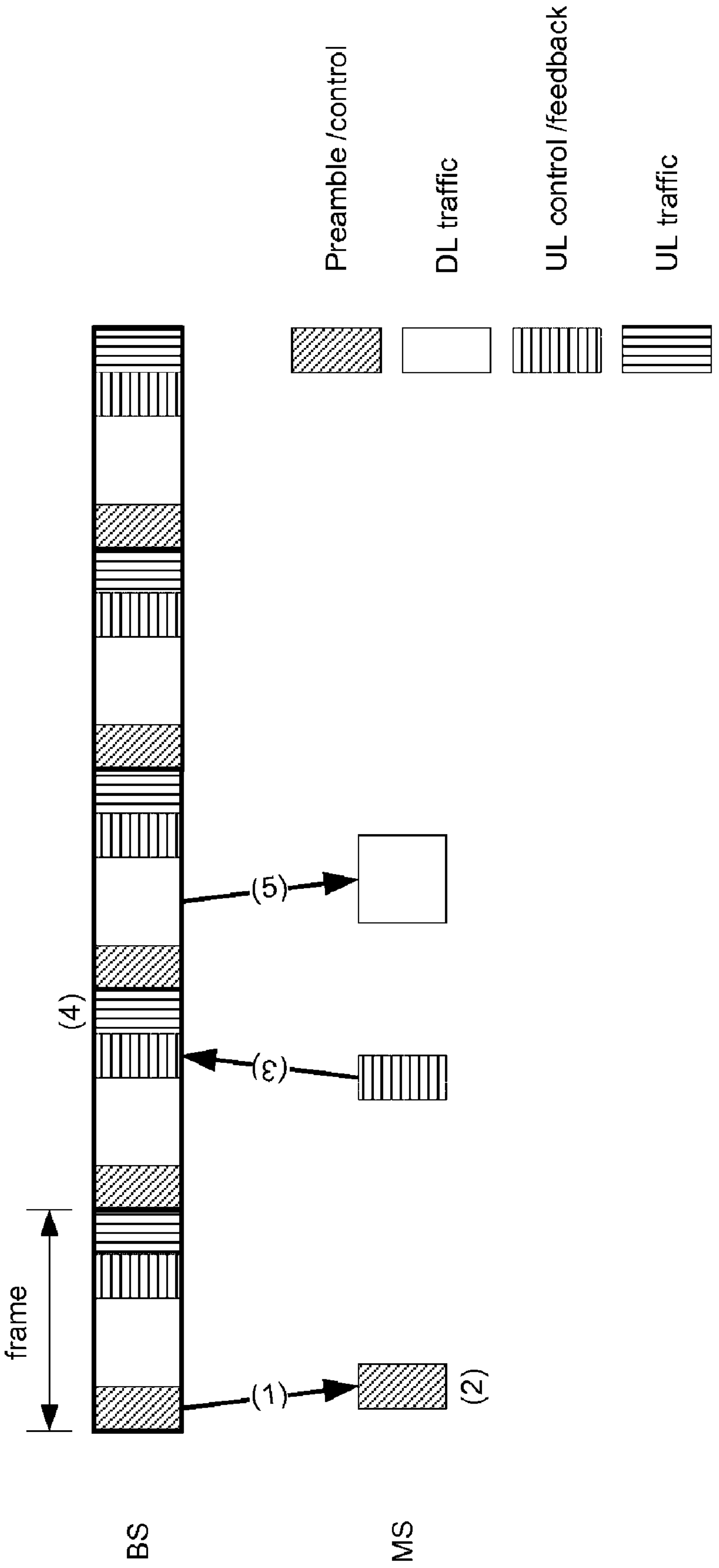
FIG. 5 illustrates an illustrative method of selective opportunistic beamforming.

FIG. 5 shows an exemplary procedure of selective opportunistic beamforming in an illustrative embodiment. The exemplary procedure comprises five operational steps. As shown in FIG. 5, a BS (not shown) broadcasts a common pilot, illustrated as step 1. In the case of explicit allocation, candidate beam-set indices are broadcast together. In step 2, an MS measures post SINR for each candidate. The MS feeds back the strongest SINR together with corresponding beams and stream indices, shown in step 3. In step 4, the BS schedules based upon feedback information received from the MSs. In step 5, the BS transmits traffic data to scheduled users which is multiplied by beam weights that BS obtained from feedback information.

Figure 6A:
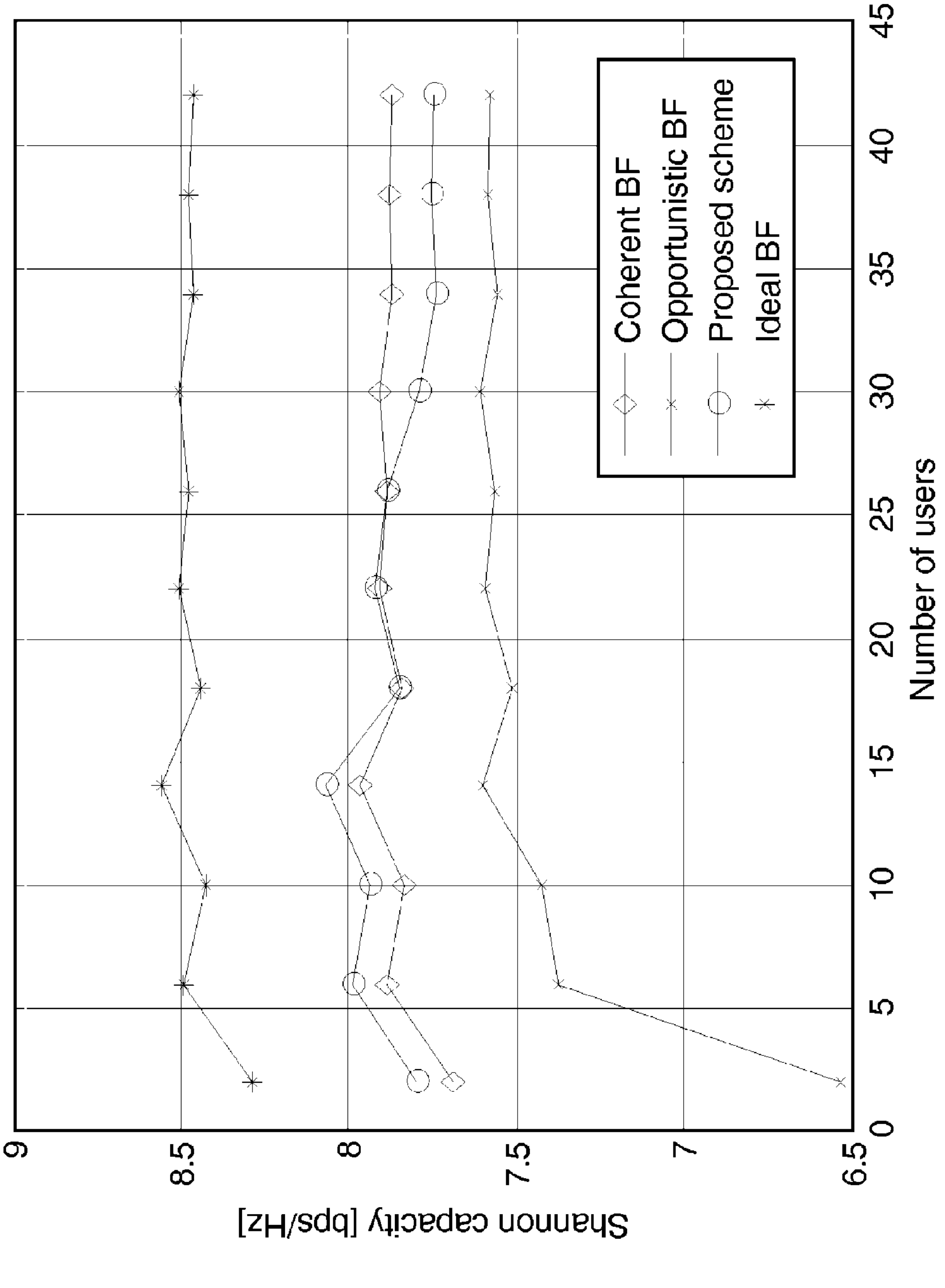
FIG. 6*a* and FIG. 6*b*, illustrate simulation results of an illustrative embodiment.
Figure 6B:
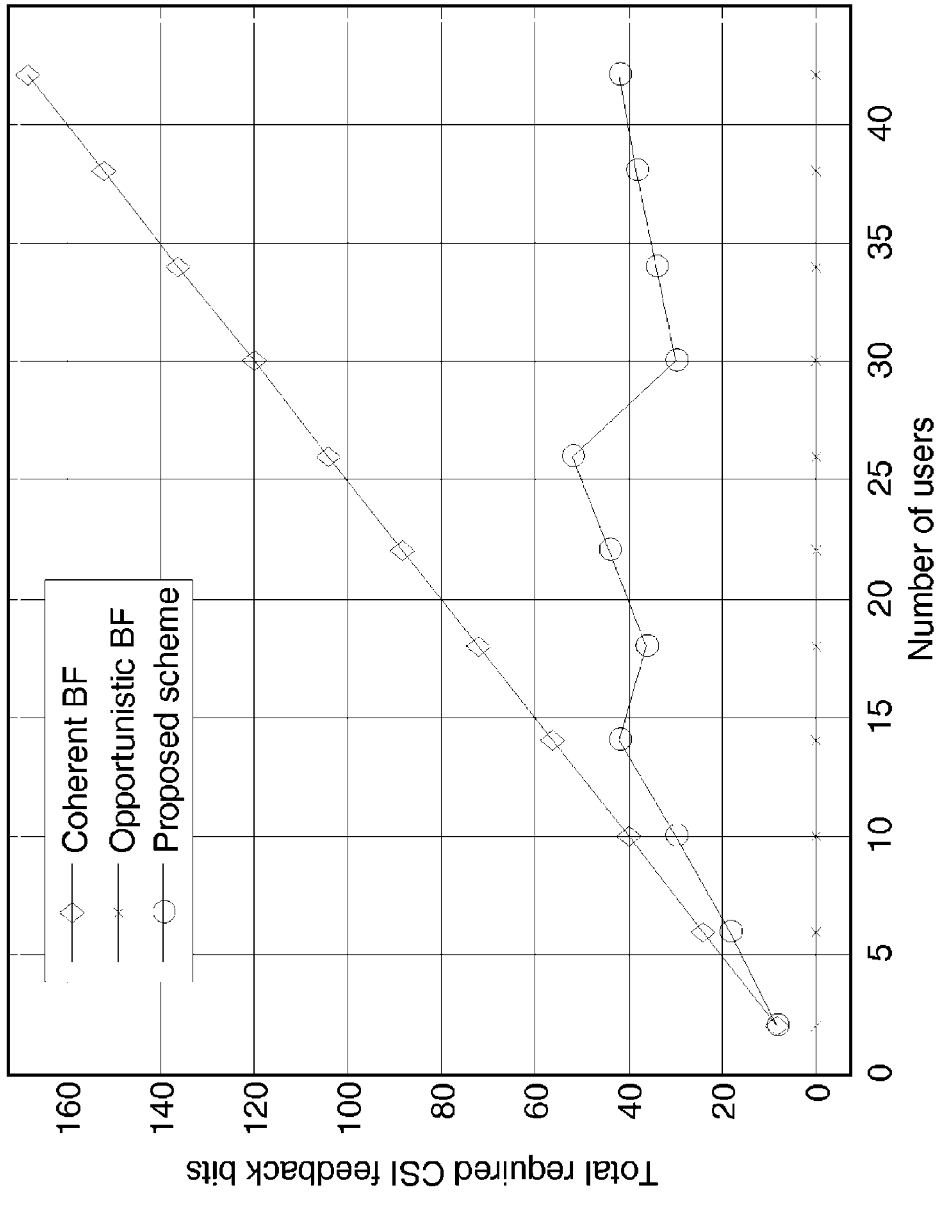

FIGS. 6(*a*) and 6(*b*) illustrate initial numerical results obtained from simulation of an illustrative embodiment. In obtaining the results, the following assumptions are made: mobility (static), antenna configuration (4Tx/1Rx), scheduler (PF scheduling, no spatial multiplexing), coherent BF (LTE's codebook for 4Tx is used).

In illustrative embodiments, the following features are provided in enabling the dynamic change of beam-sets. First, because of dynamic features of beam-sets, a BS typically has to broadcast current beam-set information to users in a cell. The broadcast information may include: Common pilot sequence, Number of streams, Number of beam-sets used, and Beam-set indices. Furthermore, if the beamforming weight changes in a periodical manner with a period of T_b, the broadcast information can be transmitted once in every T_b frames to reduce overhead associated with feed-forward information. Alternatively, part of the broadcast information (such as a common pilot sequence) can be transmitted in every frame and the other part can be transmitted once in every T_b frames. In addition, to further reduce the amount of feed-forward information of beam-set indices, one could use implicit index allocation by defining a beam-set generation function that both BS and MSs know a priori. In an exemplary embodiment, for $N_s$ number of streams, $M_{Ns}$ number of beam-sets is predefined. For every scheduling period, a BS broadcasts number of streams information ($N_s$) and number of beam-sets used ($N_b$). Then, both the BS and MSs will use beams determined by $$\text{Beam-set index}[i]=\text{mod}(K\times FRN+i,M_{N_s}),i=0,\ldots,N_b-1$$

from the beam-sets for $N_s$ streams, where K is a predefined constant and FRN denotes a frame number of a scheduled frame.

In providing the desired feedback, the following features are preferably practiced. If a BS allocates a specific number of streams and number of beam-sets, then each MS should feedback its information accordingly. This implies that the feedback channel needs to be reformatted according to beam allocation. For instance, assume that an MS feeds back the CINR of the strongest beam only. Let an exemplary BS allocate ($N_s$=4, $N_b$=2) at a certain scheduling period. Then, every MS will report 1-bit for beam-set index, 2-bits for beam index, and X-bits for CINR report. In the next scheduling period, let the BS allocate differently such that ($N_s$=4, $N_b$=4). In this case, every MS will report 2-bits for beam-set index, 2-bits for beam index, and X-bits for CINR report. In this way, the amount of feedback from MSs can be varied according to a BS's allocation information. How to manage CQI channels generally depends on specific standardization and is not germane to understanding the illustrative embodiments of the present invention.

In a case where $M_{Ns}$ predefined beam-sets are equal to the precoding matrices in CL-MIMO system and a BS allocates such that $N_b$=$M_{Ns}$, then this result can be the same as current PMI-based CL-MIMO schemes. This implies that selective opportunistic beamforming can dynamically switch from current PMI-based CL-MIMO and opportunistic beamforming schemes according to cell conditions.

In generating the predefined beam vectors in preferred embodiments, both BS and MSs generally have predefined beam-sets combined with the number of streams. That means, for $N_s$ streams there are $M_{Ns}$ beam-sets, each of which has $N_s$ orthogonal beam-vectors. Furthermore, generation of these vectors is performed prior and can be the same as the precoding matrices such as used in current standards. However, the size of the vectors can be larger than current standards to ensure randomness of opportunistic beamforming.

Advantageous feature of selective opportunistic beamforming further include the following. Part of predefined beam-sets is used at a specific scheduling time. The number of beam-sets used at a specific scheduling time can be varied and adjusted adaptively according to cell loading information such as the number of users within a cell, mobile speed, and the like. A BS transmits a common pilot, which is not beamformed, together with feed-forward information such as a number of candidate beam-sets and number of streams. The amount of required feedback information is controlled by a BS according to cell loading.

The procedures used in one preferred embodiment will be described in more detail below. To clarify the description, the following assumptions are made: Each MS has one receiving antenna. At a given period of frames, a BS broadcasts the number of streams used for MIMO. At every frame, a BS broadcasts the pilot sequences such that every MS in the cell can estimate the downlink channel for the given number of antennas. A frame counter is defined in the system. Thus, each MS can identify the FRN of a current frame. The procedures include, but are not limited to, the following operations. At every T_b period of frames, a BS determines the number of required beam-sets $N_b$ according to the number of active users $N_u$ such that $$N_b=\max(\text{ceil}(K_u\times N_u^{-1}),1)$$

where $K_u$ is a given constant. The BS broadcasts $N_b$ information throughout the cell. Each MS identifies $N_s$ and $N_b$ information at the first frame of every T_b frames. An MS selects a candidate beam-set which is in the form of a predefined equation:

$$\text{Beam-set index}[i]=\text{mod}(K\times FRN+i,M_{N_s}),i=0,\ldots,N_b-1$$

An MS estimates a downlink channel by using downlink common pilot sequences and estimates signal-to-interference-and-noise ratio (SINR) of each candidate beam such that $$SINR_{i,j}=\frac{|w_{i,j}'h|^2}{N+\left|\sum_{k\neq j}w_{i,k}'h\right|^2}$$

where, h and $w_{i,j}$ imply a channel vector from BS to MS and a beamforming vector of the j-th streams in an i-th beam-set. For the MS, the feedback information are beam-set index (i), beam index (j), and SINR of $$\max_{i,j}(\text{SIN}R_{i,j}).$$

By using feedback information from every user, a BS schedules for the rest of T_b periods. In this case, several scheduling algorithms can be applied. In an illustrative example, a "maximization of sum-rate" criterion is employed (dynamic power allocation is not applied in this example, although it is not excluded from the contemplated scope of the present invention). The optimum beam-set is selected by $$\text{Optimum beam set}=\arg\max_i\left(\sum_j\log\left(1+\max_k(SINR_{i,j}^k)\right)\right)$$

where $SINR_{i,j}^k$ denotes SINR of k-th user that utilizes beam-set index and beam index of (i,j). A BS allocates the selected users in the rest of the T_b periods.

Other techniques that can reduce feedback information in opportunistic beamforming, such as threshold-based feedback, can also be applied in the illustrative embodiments. In a case of multiple numbers of receiving antennas in a mobile station, each mobile station has a degree of freedom for the number of streams up to the number of receiving (RX) antennas and can be easily applied to the proposed scheme without loss of generality.

Figure 7:
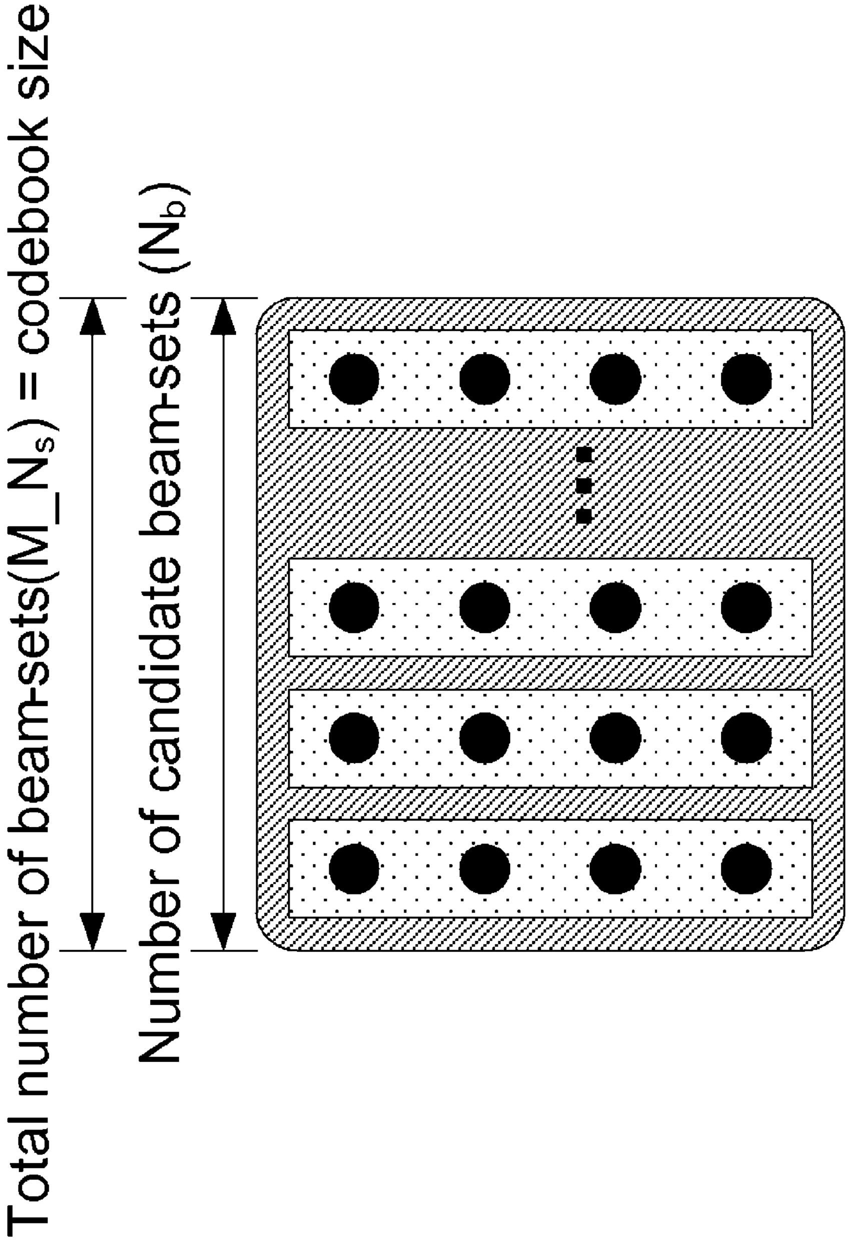
FIG. 7 illustrates another illustrative embodiment, where features of selective opportunistic beamforming can be extended to conventional CL-MIMO.

FIG. 7 illustrates another preferred embodiment, where features of selective opportunistic beamforming can be extended to conventional CL-MIMO systems. This is achieved by properly setting parameters of selective opportunistic beamforming such that the total beam-sets is composed of unitary codebooks, and the number of candidate beam-sets is set equal to total number of beam-sets.

Figure 8:
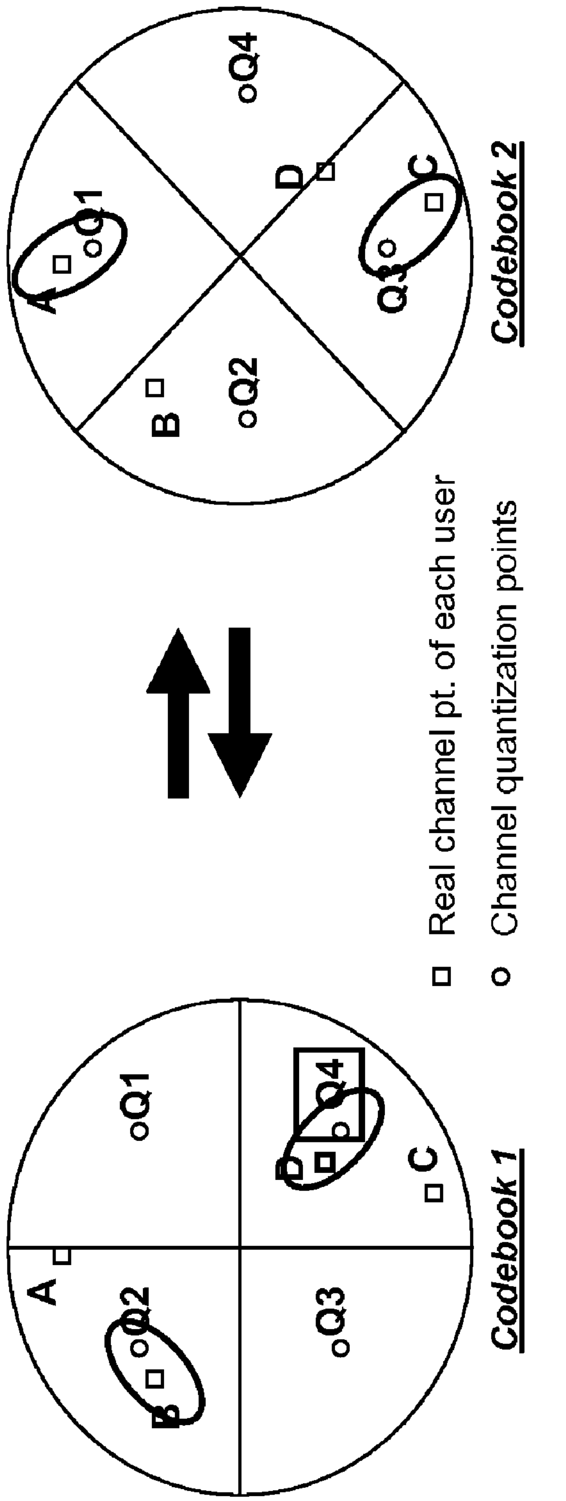
FIG. 8 schematically illustrates an embodiment wherein extension to code diversity is provided.

FIG. 8 illustrates another embodiment, where the extension to code diversity is presented. Codebook diversity for low mobility users preferably includes target of MU-MIMO aims for low mobility users. A channel of low mobility users does not fluctuate in time, which will result in low multi-user diversity gain. In this case, switching between several codebook sets gives more fluctuation in a channel, and thus more multi-user diversity gain.

Figure 9:
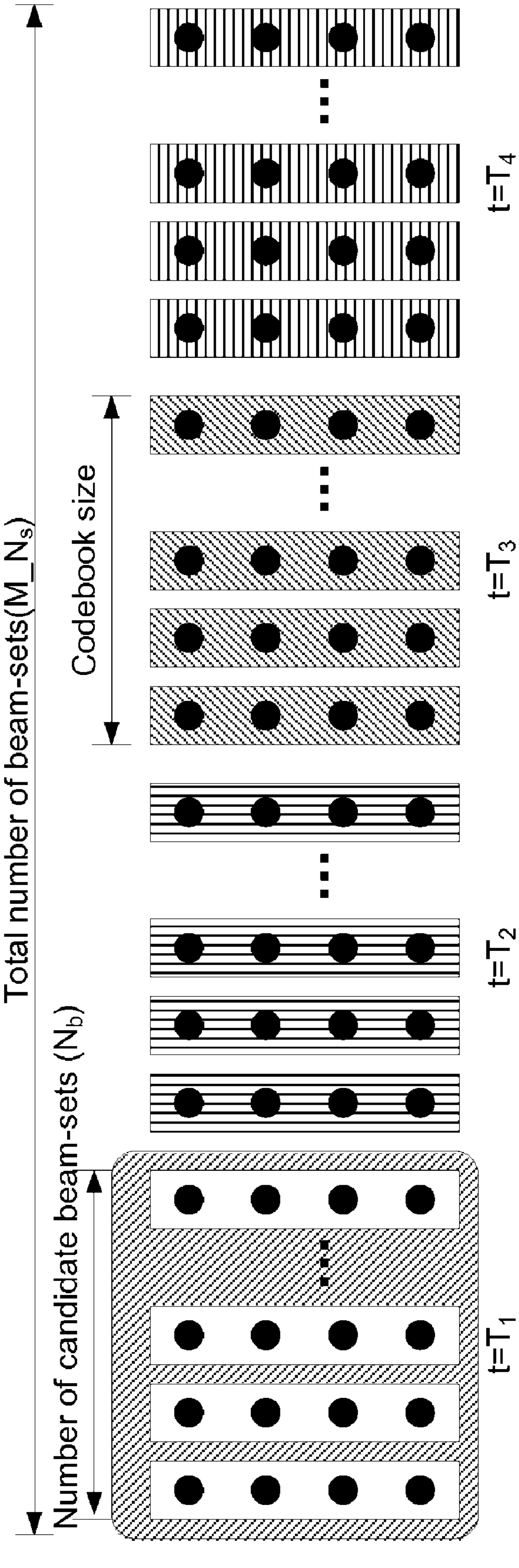
FIG. 9 schematically illustrates use of multiple codebooks for entire beam-sets in an illustrative embodiment.

FIG. 9 shows an exemplary selective opportunistic beamforming embodiment, wherein multiple codebook sets can be used for entire beam-sets. In FIG. 9, the entire beam-sets are composed of 4 different codebook sets. At a specific scheduling time, the number of candidate beam-sets is equal to the size of each codebook set. With this approach, switching between different codebook sets can give diversity in codebook matching, especially for low mobility users whose channel characteristics do not rapidly change.

Default beam-sets may be used in different occasions. In one example, assume a mobile user located in a cell edge area fails to properly decode a feed-forward signal. Hence, the feedback signal may not correctly express proper beam vector information for the user. To prevent such an error from arising, one can define default beam-sets in the entire beam-sets. The Power and Modulation and Coding (MCS) rate for the broadcast channel is set at a level such that some weak users may not decode the signal. This will force the weak users to use the default codebook. The default codebook can then be optimized for weak users, namely be rank 1, with few entries to minimize both up and downlink control overhead. Also, the power and MCS can be set at an even lower rate/power for other codebooks which are optimized for good users (i.e., users having good reception), namely higher rank and larger codebooks. By transmitting at a low power codebook information which is intended for good users, interference to neighboring cells is limited.

The use of default beam-sets can be considered in two different ways. In a first approach, an MS's feedback information includes default beam-sets. Among $M_N$ entire beam-sets, $N_{df}$ beam-sets are pre-defined as default beam-sets. The number and value of default beam-sets is prior broadcast. The number of beam-sets, $N_{df}$ can be 0 up to number of candidate beam-sets ($N_b$). At every scheduling period, the candidate beam-sets preferably include $N_{df}$ default beam-sets. If a mobile station does not receive feed-forward information, or if post SINR for candidate beam-sets are less than that of candidate beam-sets, the mobile station feeds back a proper beam index within the default beam-sets. The MS chooses between the default codebook and the broadcasted codebook, depending on whether the MS can receive the broadcast or not, or depending upon which codebook would maximize the MS performance. T his can be accomplished because the default codebook is typically optimized for range increase (low rate codebook) while the broadcasted codebook is optimized for capacity increase (high rate codebook). The feedback for the two codebooks happens on two different RACH's (Random access channels), thus indicating which codebook was selected.

In an alternative approach, a BS allocates a specific scheduling slot for default beam-sets. Default beam-sets are predefined and the number and value of default beam-sets is prior broadcast. A BS allocates specific scheduling resources only for default beam-sets, which implies that specific scheduling resources MSs feed back among default beam-sets only. Therefore, the candidate beam-sets at these scheduling resources are limited to default beam-sets, and other than these scheduling resources, default beam-sets are not used. A BS preferably broadcasts how to allocate resources for default beam-sets. For example, this resource can be allocated periodically, and can be designated with explicit messages. Moreover, any kind of resources such as time slots, frequency sub-bands, (pseudo-) orthogonal codes, and the like, can be used for this purpose.

Figure 10:
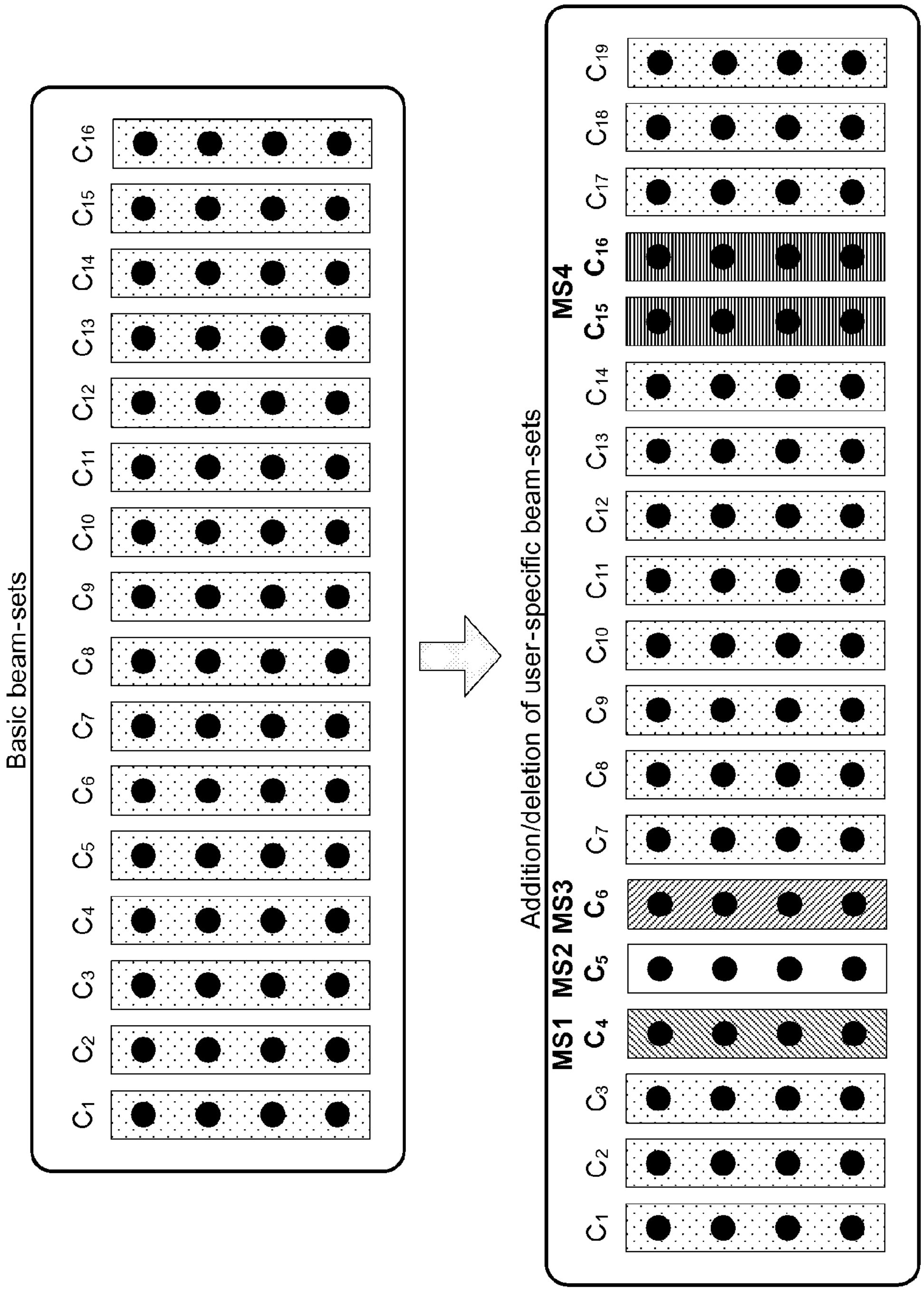
FIG. 10 schematically illustrates an illustrative approach to addition and/or deletion of user-specific beam-sets.

FIG. 10 illustrates a preferred embodiment approach to the addition and/or deletion of user specific beam-sets. In a case where a BS can estimate spatial information of a specific user (such as direction of arrive, or DoA, Channel correlation matrix, etc), which especially have non-time selective characteristics, user-specific beam vectors instead of allocating random vectors will be helpful for the user. The cell loading information may include a number of users within a cell, a direction of approach indicator, or both. Thus, it is possible to define addition and deletion of user specific beam-sets to basic random beam-sets, which will increase system throughput.

Figure 11:
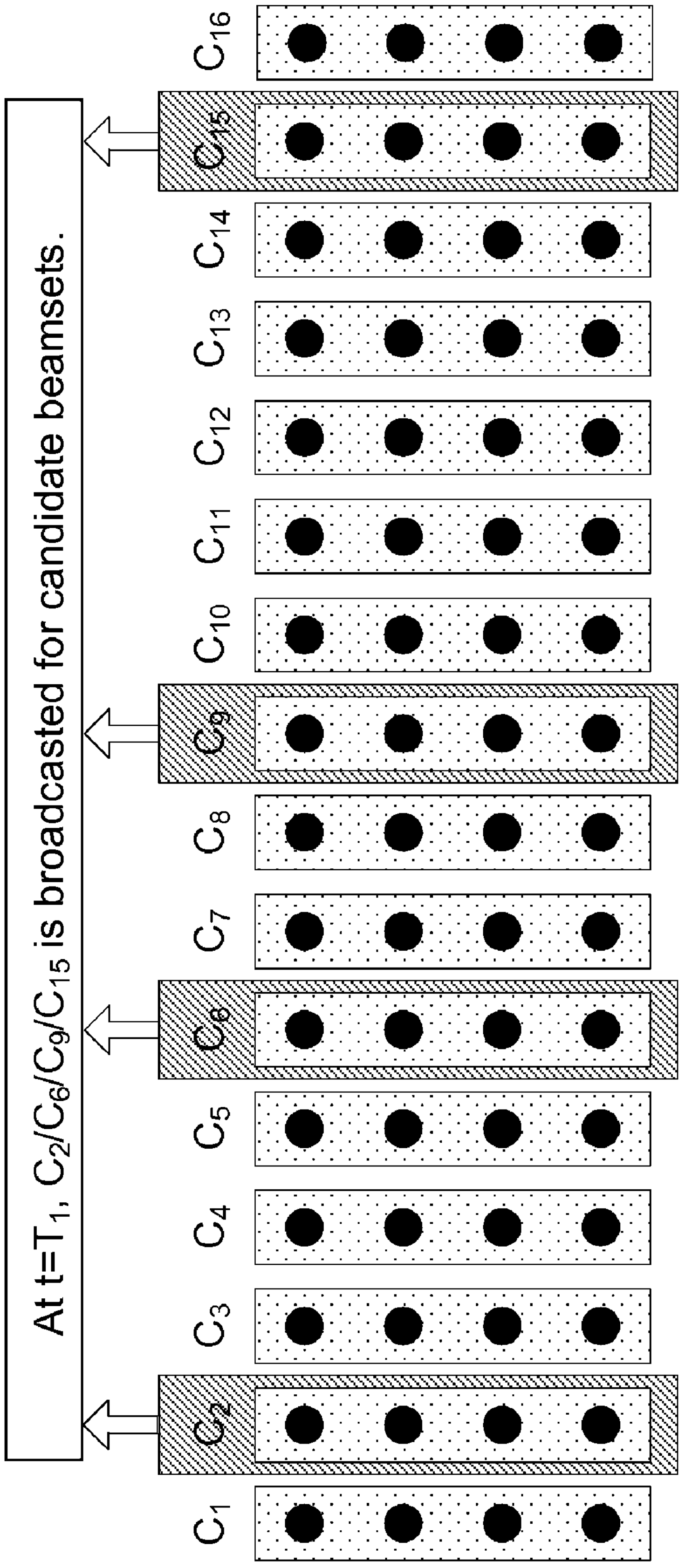
FIG. 11 schematically illustrates an illustrative embodiment of direct indexing for specific users.

FIG. 11 shows direct indexing for specific users when a BS has prior information of specific users, in which case the BS can directly allocate the corresponding candidates instead of given an allocation sequence.

Figure 12:
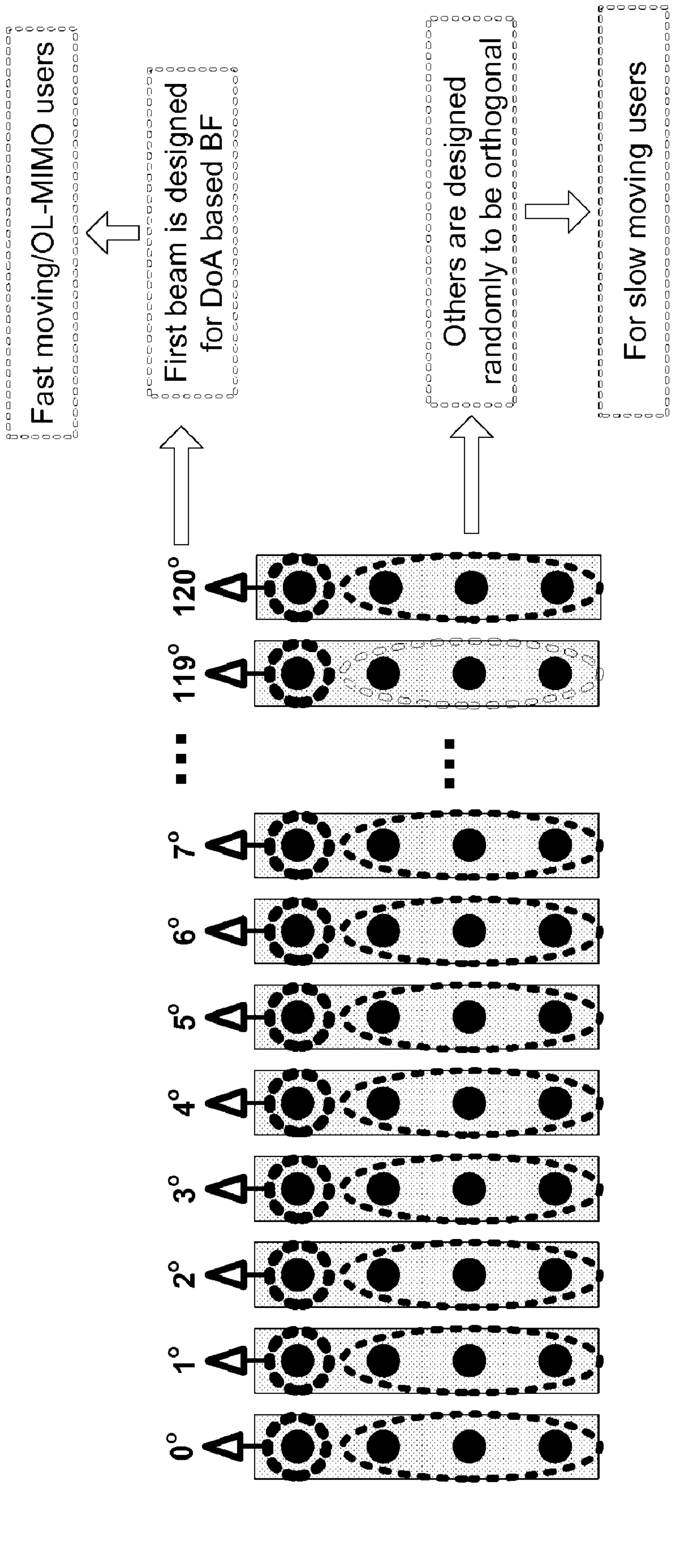
FIG. 12 schematically illustrates how fast moving users can be accommodated in an illustrative embodiment.

FIG. 12 illustrates features of preferred embodiments in supporting fast moving users. A specific stream in a beam set is generated according to a spatial signature such as DoA. For fast moving users because of short coherence time, use of CL-MIMO does not give performance gain over open loop MIMO (OL-MIMO). However, even for fast moving users, spatial signatures such as DoA do not vary greatly with a time varying channel. Hence, if a BS has the capability of estimating spatial signature, the BS generates beam-sets such that a specific stream in a beam set follows a spatial signature such as DoA. Other streams within the beam-sets are randomly generated. Preferably, the BS uses direct-indexing for fast moving users and slow moving users will use other streams for multi-user diversity.

Advantageous features of the illustrative embodiments include, but are not limited to, trade off between feedback overhead and performance can be controlled by a BS. The total amount of feedback is reduced while maintaining system performance. The above described approaches can be generalized to include conventional CL-MIMO systems. Some embodiments of the present invention can have various revisions to increase system performance. The required specification support may include variable size of PMI feedback that may require new physical channel design, DL broadcasting channel for feed-forward channel, antenna specific common pilot for CINR calculation that is similar to current MIMO midamble, and CQI/PMI feedback channel allocation methodology with small signaling overhead.

Figure 14A:
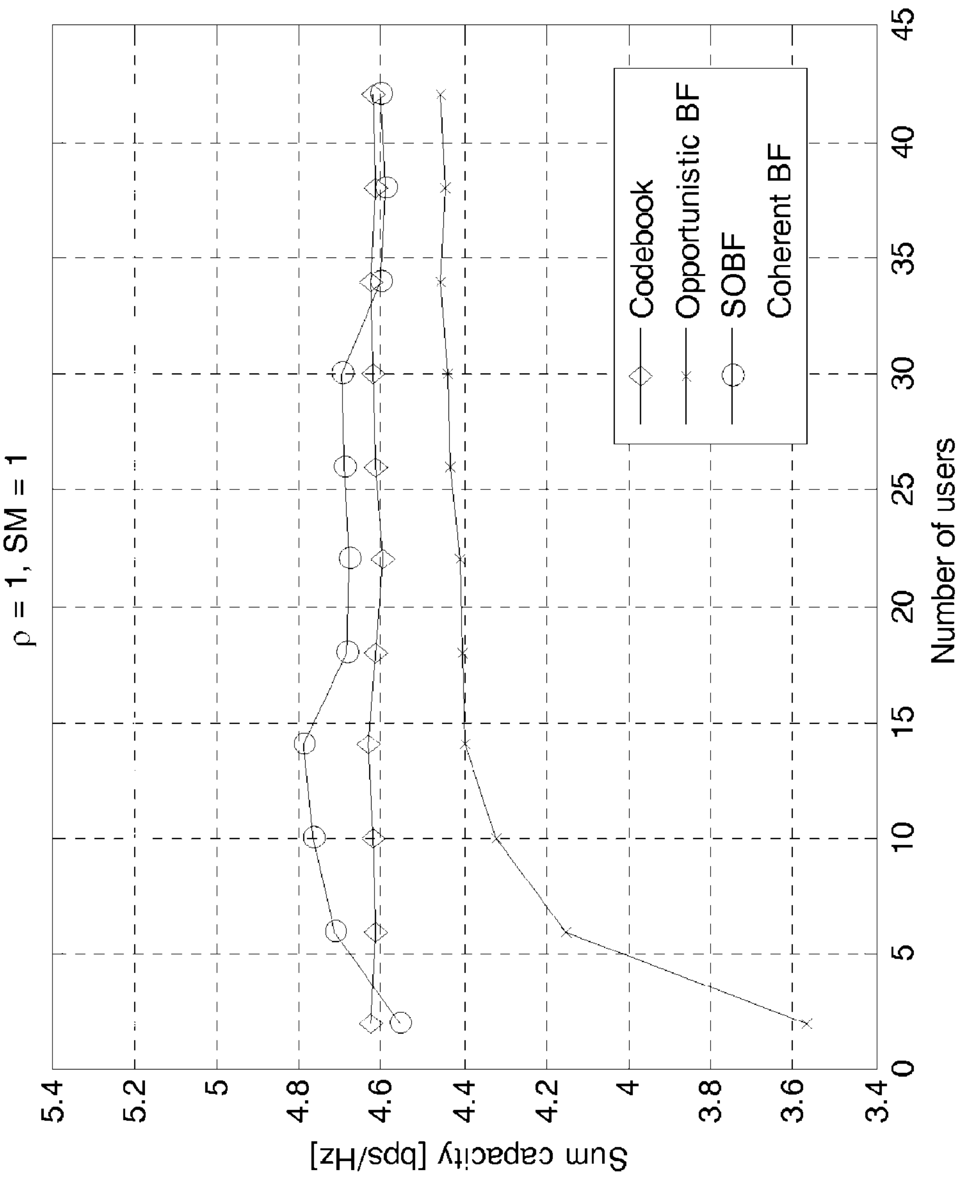
FIGS. 14*a*, 14*b*, 15*a*, 15*b*, 16*a*, and 16*b* are results of simulations of illustrative embodiments of the present invention.
Figure 14B:
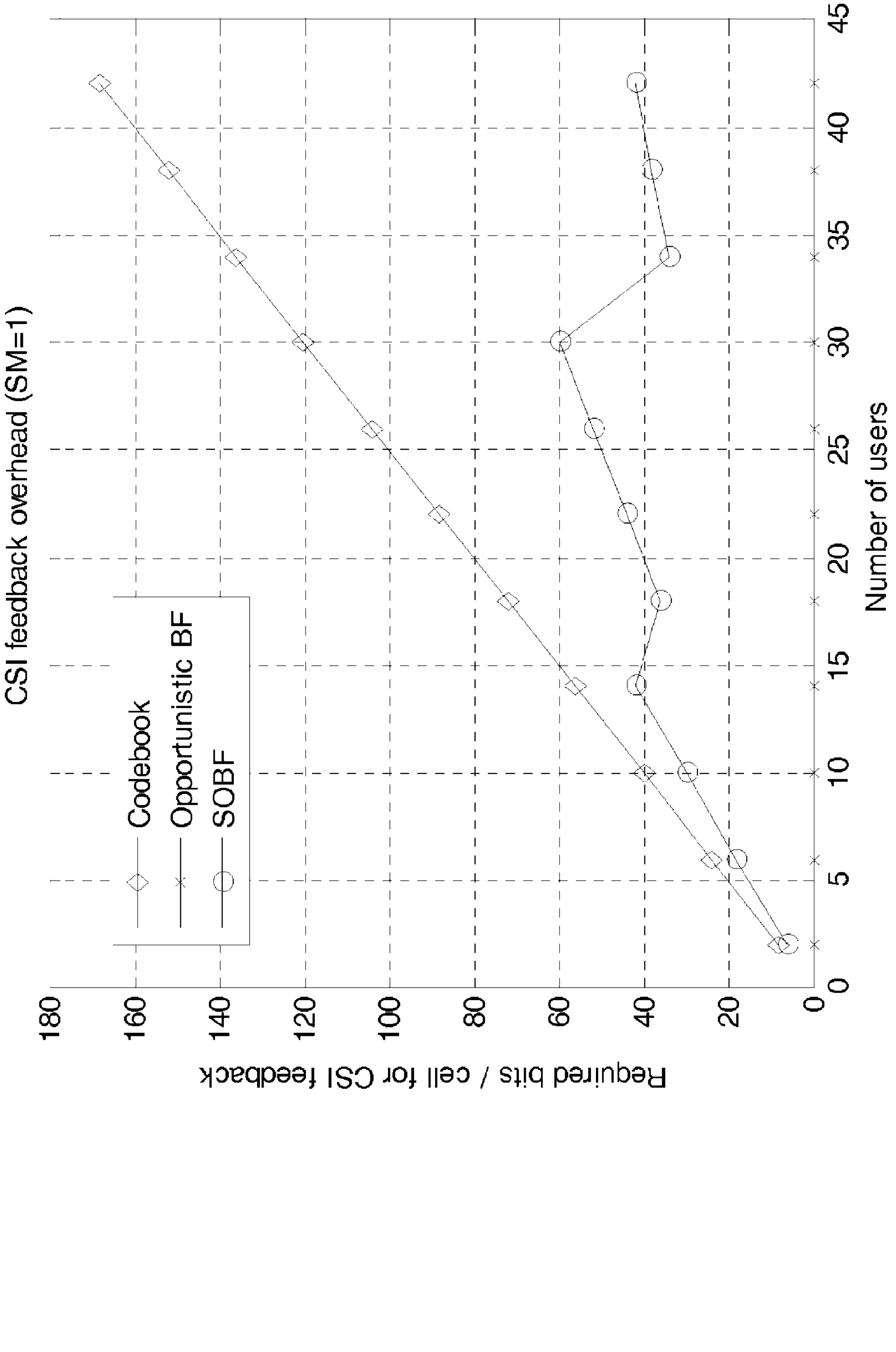
Figure 15A:
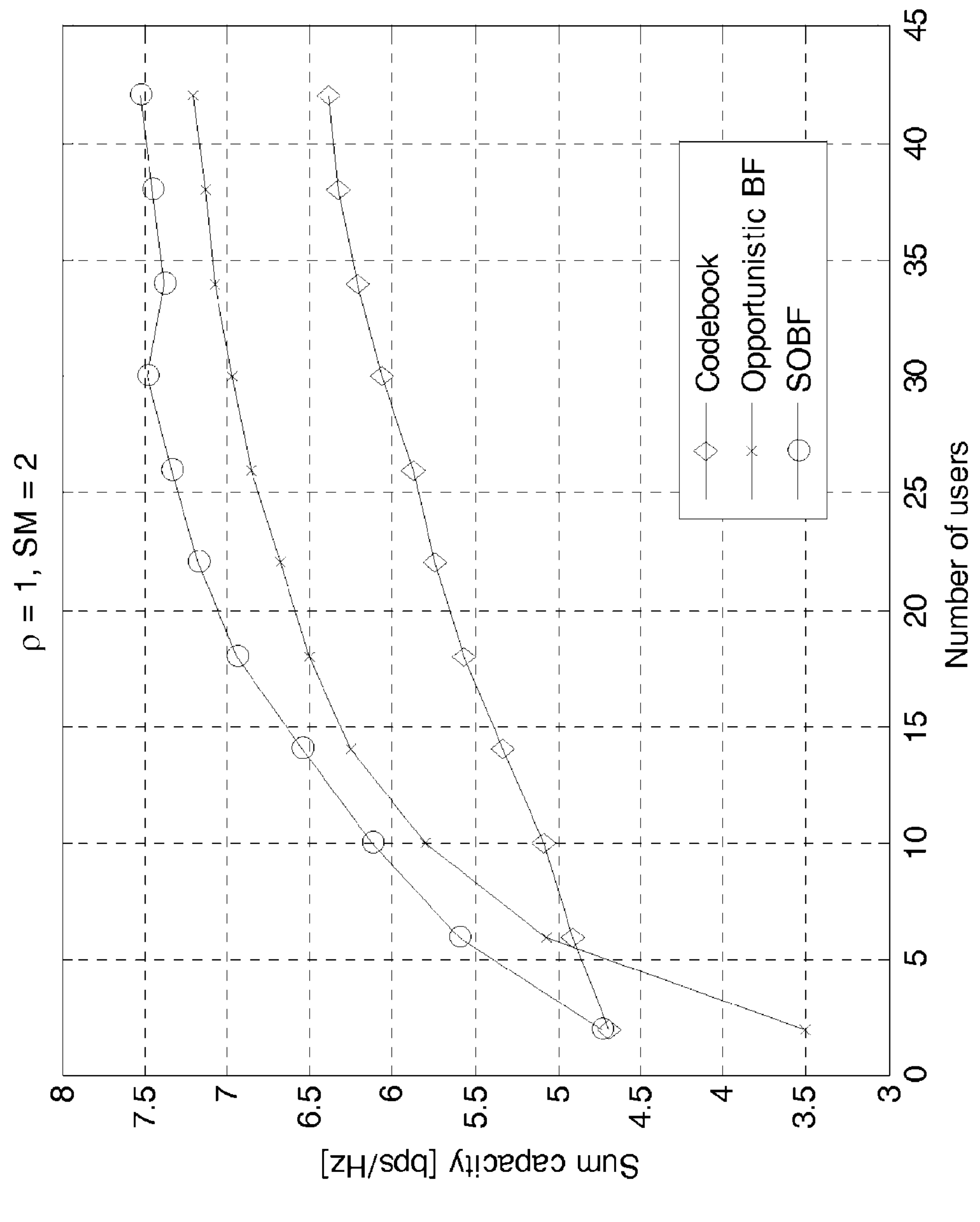
Figure 15B:
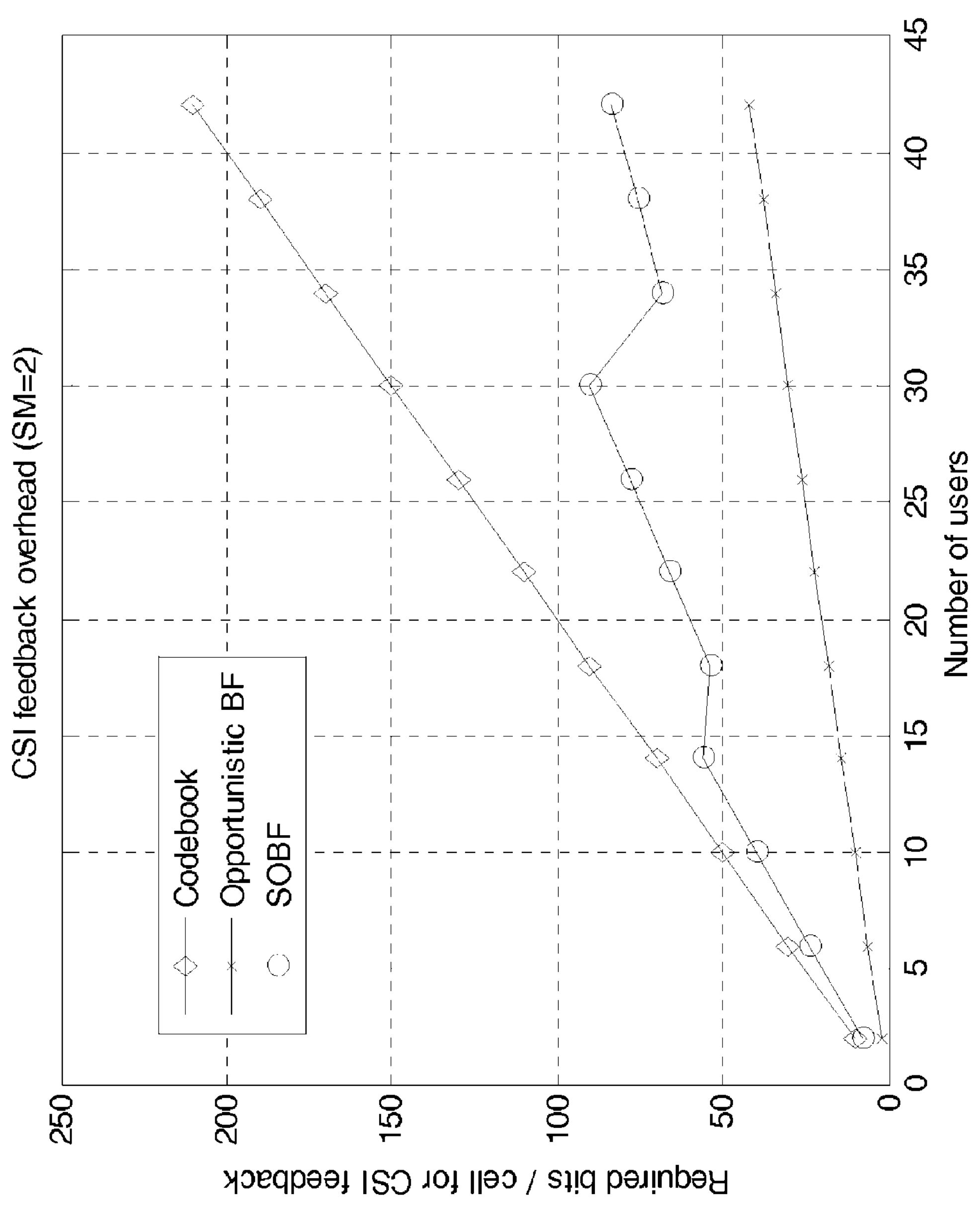
Figure 16A:
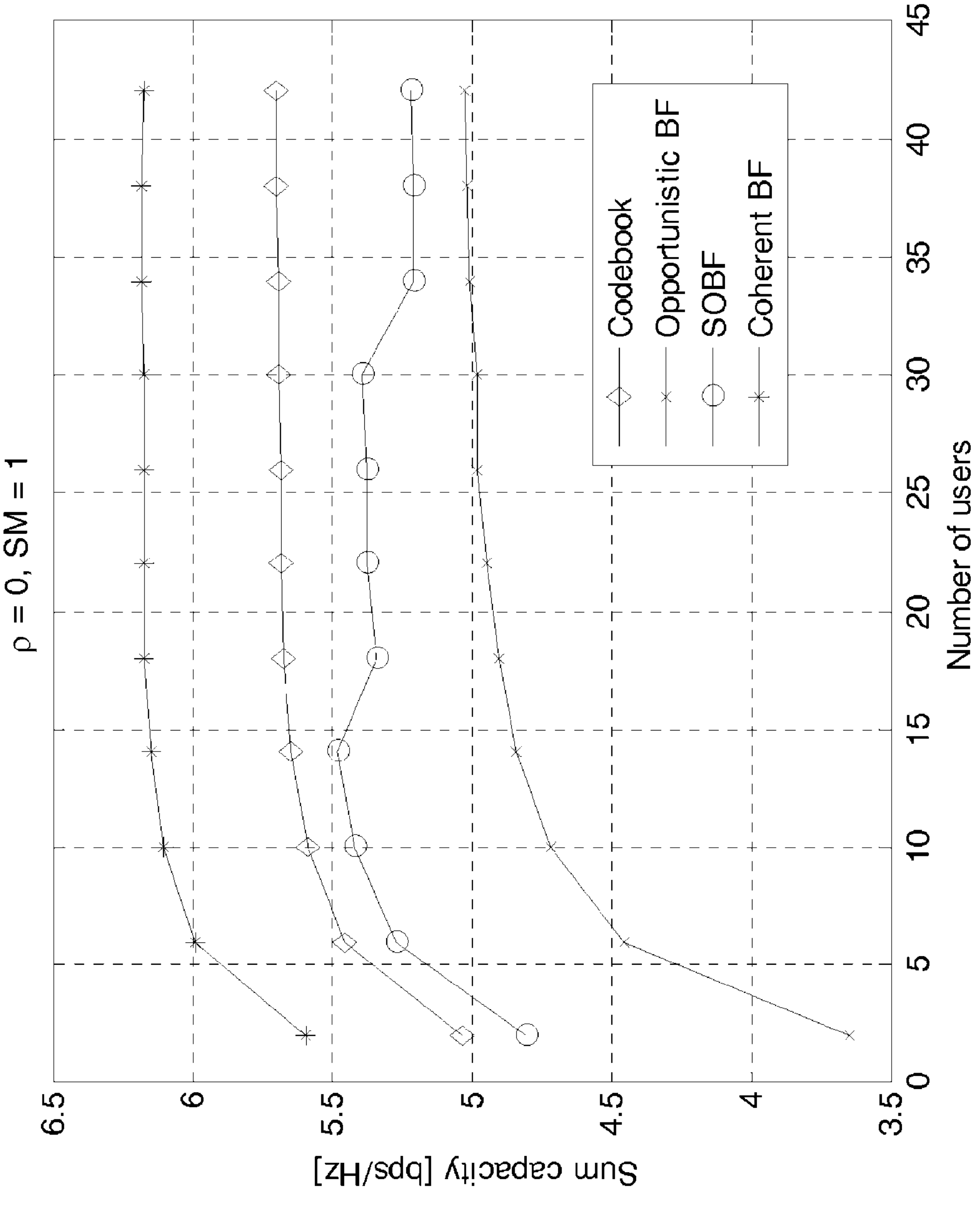
Figure 16B:
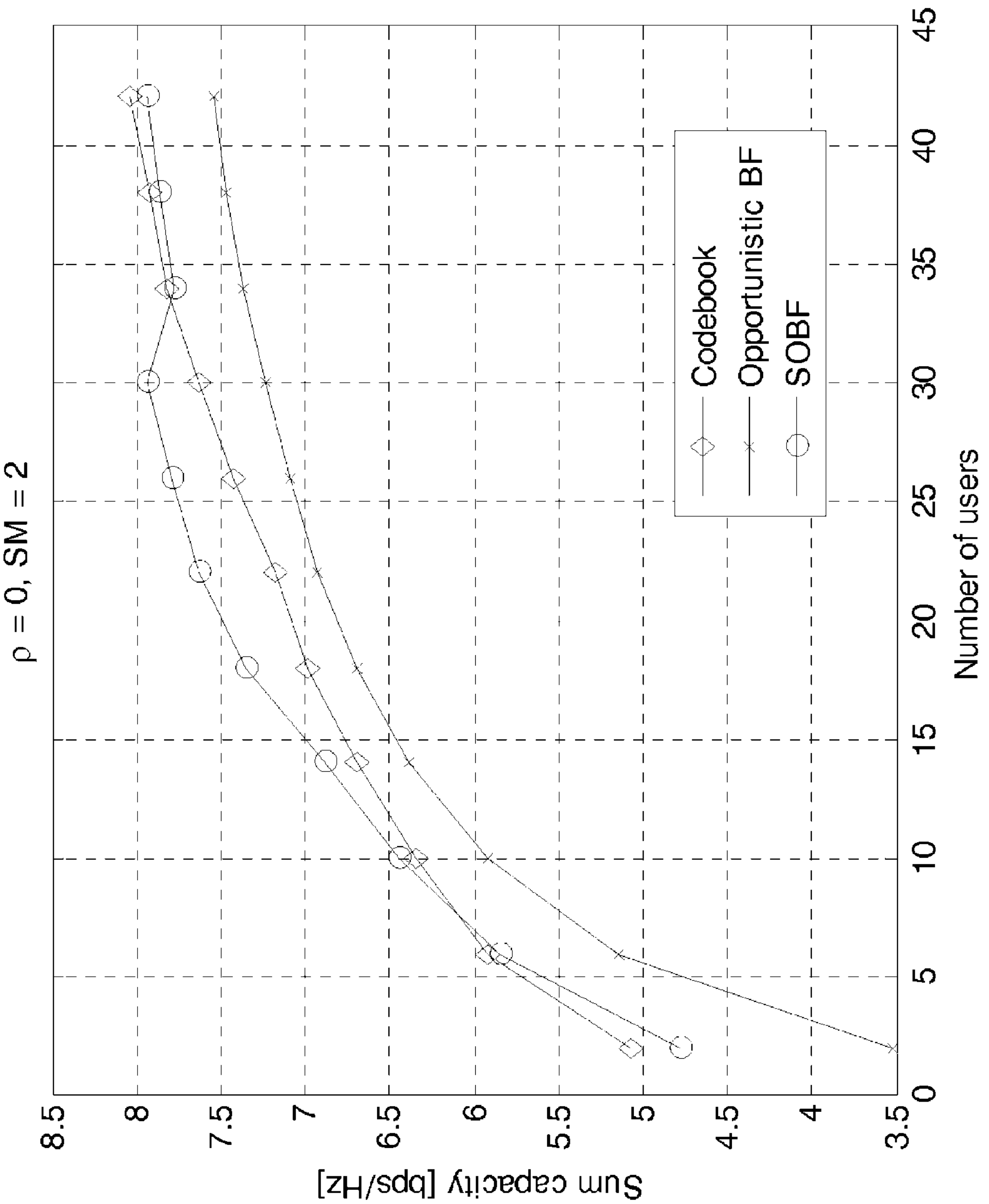

FIGS. 14 through 16 illustrate simulation results for illustrative embodiments of the present invention. FIG. 13 shows the simulation conditions used in the simulations. Proportional fair scheduling for SM=2 considered in the simulation includes assigning a first user with a PF metric. Among MSs using a same codebook with different streams, a PF metric is also used for assigning a second user.

FIGS. 14(*a*) and 14(*b*) show the simulation results when SM=1, static case (ρ=1). FIGS. 15(*a*) and 15(*b*) show the simulation results when SM=2, static case (ρ=1). FIGS. 16(*a*) and 16(*b*) show the simulation results of high mobility case (ρ=0).

The preferred embodiments of the present invention also preferably include features for protecting cell edge users. The protection features resolve issues in relation to users close to a cell edge. A user at a cell edge may occasionally fail to receive feed-forward information sometime, in which case the user has no information on what beam-sets are used for entire scheduling period (e.g., super frame). A first solution adopted in a preferred embodiment includes assigning a predefined default codebook in feedback information. Some portions of candidate beam-sets are allocated to the default codebook. In the event a mobile station fails to receive feed-forward information, the mobile station feeds back a best beam among default codebook. This solution has a disadvantage, however, of waste of feedback information.

A solution adopted in other preferred embodiments includes the use of a dedicated resource for a default codebook. If a mobile station fails to receive feed-forward information, the mobile station will not feedback (alternatively, the MS will feedback with a special indication of the absence of feed-forward information). The BS identifies that a certain user is in failure (either from the absence of feedback for that user or from the special indication). Subsequently, the affected mobile station feedbacks with a default codebook. The BS schedules these affected users in a specific resource (time slot/freq. band, codes, etc) only for the default codebook. The periodic use of down link (DL) resources for default codebook users may result in waste of resources, however. Optimization of the amount of resource for default codebook is generally desirable.

In a further solution, a dedicated message is sent to failed users if a mobile station fails to receive feed-forward information. The MS will not feedback (or, alternatively, the MS will feedback with a special indication.) In response, the BS sends a dedicated message containing feed-forward information to the user. After receiving feed-forward information, the user may feedback normally. However, this solution may increase signaling overhead for dedicated message, and cause more time delay than other solutions.

In an additional solution, each time a BS transmits feed-forward information, the BS transmits a counter also. The counter value increases if feed-forward information is changed. If a mobile station fails to receive feed-forward information, the mobile station checks its counter value. If the counter value has not been changed, it may feedback normally. If counter value has been changed, however, the MS will be idle for the scheduling duration. If a BS changes feed-forward information frequently, however, there could be a performance degradation for edge users.

Further advantageous features of embodiments of the present invention include that a transmitter can vary the number of precoding matrices adaptively according to cell loading. The number of feedback bits is accordingly controlled, and thus can optimize the required feedback size. Multiple precoding matrices can be simultaneously used in one entire beam-sets, which that can increase channel matching accuracy, especially for low mobility users.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A method for coordinating beam forming between a base station and a communicating entity comprising:

obtaining cell loading information for a cell; wherein the base station is located in the cell;

adjusting a number of used beam-sets used by the base station at a specific scheduling time according to the cell loading information, wherein there are a fewer number of used beam-sets used by the base station for higher cell loading than for lower cell loading; and transmitting a common pilot that is not beam-formed together with feed-forward information according to the cell loading information.

2. The method of claim 1 wherein the communicating entity is a mobile station.

3. The method of claim 1 wherein the cell loading information includes a number of users within the cell, a direction of approach indicator, or both.

4. The method of claim 1 further comprising receiving feedback information from users.

5. The method of claim 4 wherein the feedback information includes beam-set index, beam index, and signal-to-interference-and-noise ratio (SINR).

6. The method of claim 1 further comprising employing closed loop multiple input multiple output (CL-MIMO) protocols for communication.

7. A communication system comprising:

a base station configured to communicate with a plurality of mobile stations, logically organized in a cell;

the base station configured to obtain loading information about the cell, adjust a number of used beam-sets used by the base station at a specific scheduling time according to the cell loading information, wherein there are a fewer number of used beam-sets used by the base station for higher cell loading than for lower cell loading, and transmit a common pilot that is not beam-formed together with feed-forward information according to the cell loading information.

8. The communication system of claim 7 wherein at least one mobile station in the plurality of mobile stations is configured to feed back to the base station a signal-to-interference-and-noise ratio.

9. The communication system of claim 7 wherein the communication system employs closed loop multiple input multiple output (CL-MIMO) protocols.

10. The communication system of claim 7 wherein the cell loading information includes a number of users within the cell, a direction of approach indicator, or both.

11. The communication system of claim 8 wherein the at least one mobile station is further configured to feed back to the base station a beam-set index and a beam index.

12. A base station for communication with a plurality of mobile stations comprising:

means for obtaining cell loading information for a cell in which the base station is located;

means for adjusting a number of used beam-sets used by the base station at a specific scheduling time according to the cell loading information, wherein there are a fewer number of used beam-sets used by the base station for higher cell loading than for lower cell loading; and means for transmitting a common pilot that is not beam-formed together with feed-forward information according to the cell loading information.

13. The base station of claim 12 wherein the base station employs closed loop multiple input multiple output (CL-MIMO) protocols.

14. The base station of claim 12 wherein the cell loading information includes a number of users within the cell, a direction of approach indicator, or both.

15. The base station of claim 12 further comprising means for receiving feedback information from at least one of the plurality of mobile stations.

16. The base station of claim 15 wherein the feedback information includes beam-set index, beam index, and signal-to-interference-and-noise ratio (SINR).

* * * * *